Feb. 8, 1955  C. B. RICHEY  2,701,568
OSCILLATING CORN HUSKING BED HAVING A SCREEN THEREUNDER
Filed June 4, 1952  3 Sheets-Sheet 1
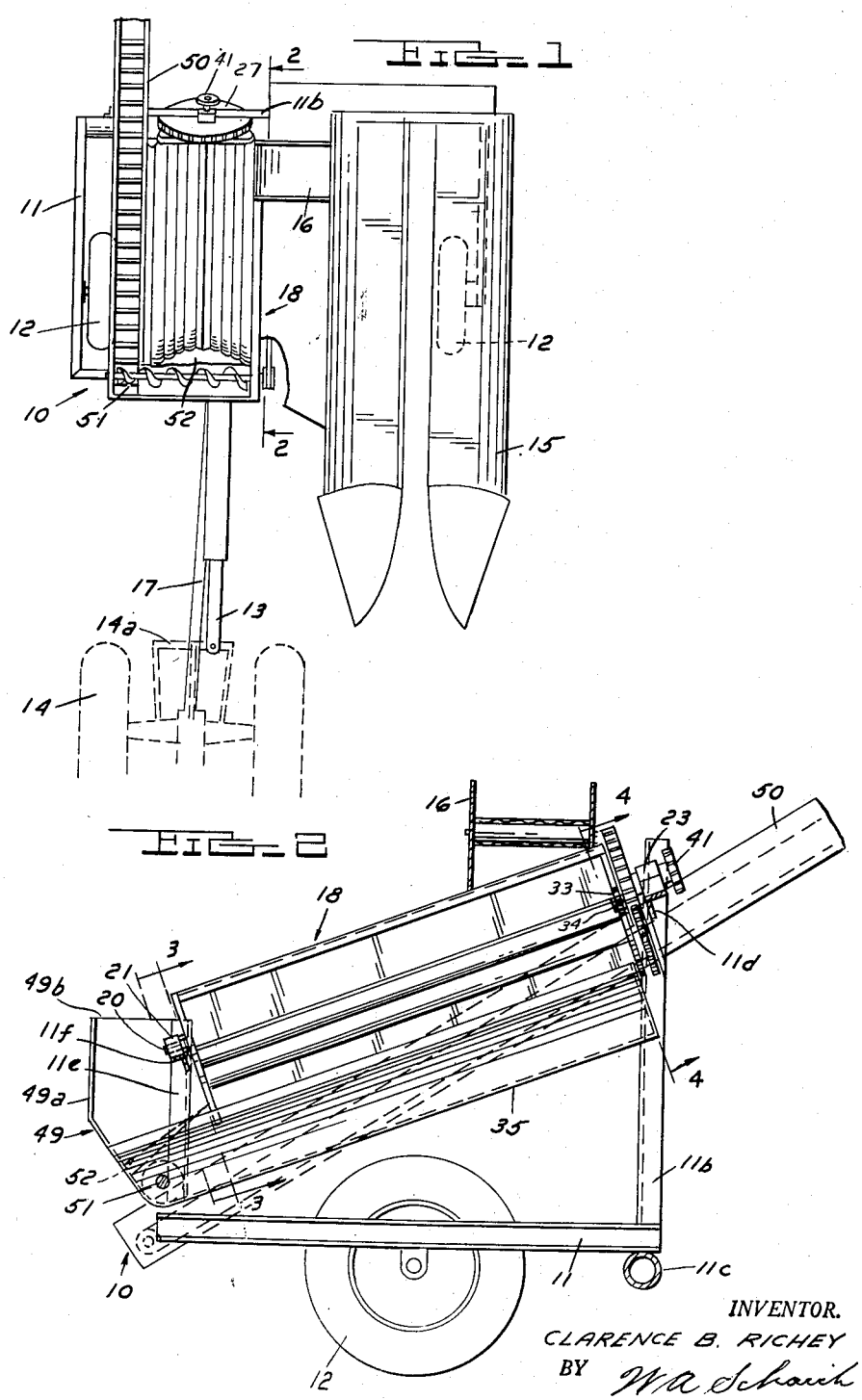
INVENTOR.
CLARENCE B. RICHEY
ATTORNEYS Feb. 8, 1955   C. B. RICHEY   2,701,568
OSCILLATING CORN HUSKING BED HAVING A SCREEN THEREUNDER
Filed June 4, 1952   3 Sheets-Sheet 2
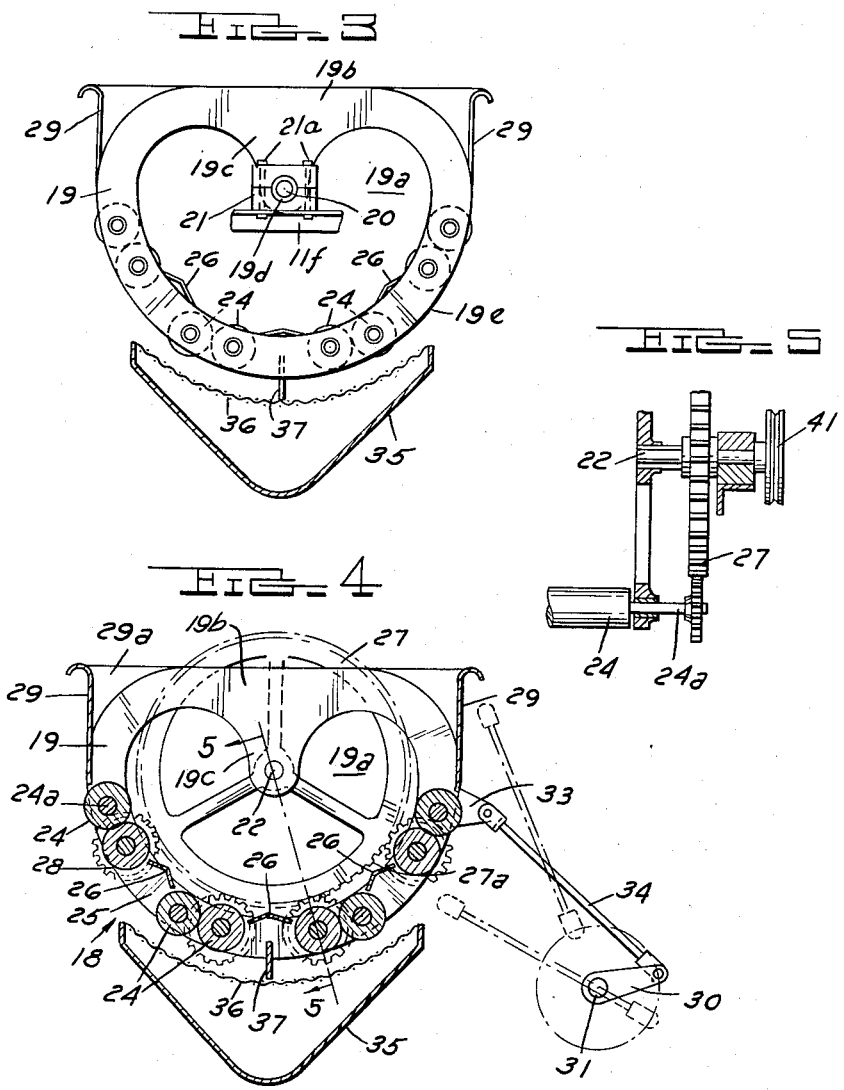
INVENTOR.
CLARENCE B. RICHEY
BY
ATTORNEYS Feb. 8, 1955 C. B. RICHEY 2,701,568
OSCILLATING CORN HUSKING BED HAVING A SCREEN THEREUNDER
Filed June 4, 1952 3 Sheets-Sheet 3
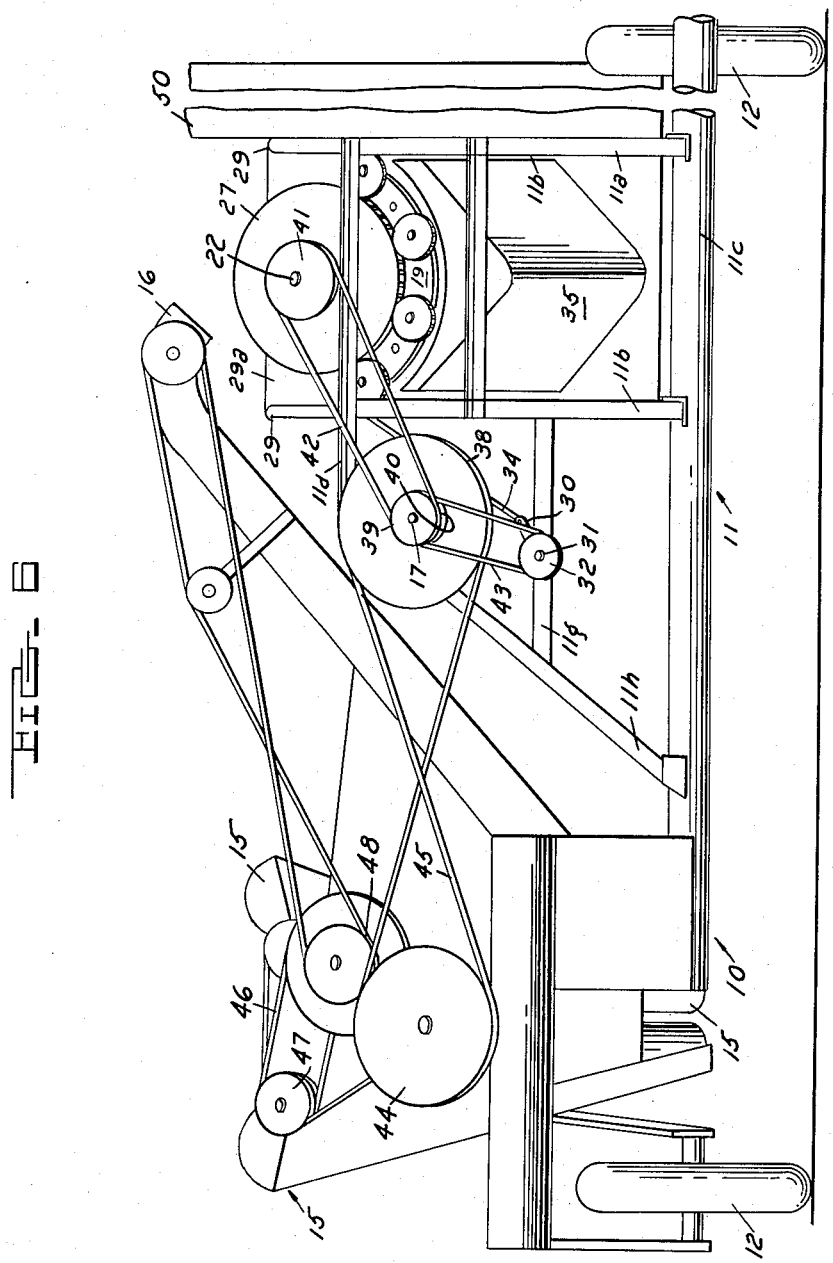
INVENTOR.
CLARENCE B. RICHEY
BY
ATTORNEYS

United States Patent Office 2,701,568
Patented Feb. 8, 1955

2,701,568

OSCILLATING CORN HUSKING BED HAVING A SCREEN THEREUNDER

Clarence B. Richey, Royal Oak, Mich., assignor, by mesne assignments, to Ford Motor Company, Dearborn, Mich., a corporation of Delaware Application June 4, 1952, Serial No. 291,641

1 Claim. (Cl. 130—5)

This invention relates to an improved husking bed for a corn picking machine.

The husking unit of a corn picking machine is an important part of such a machine because of the necessity for completely removing the entire husk from the corn ears. Incompletely husked corn ears seriously interfere with the proper drying of the corn when stored in a bin, and improper drying generally results in considerable spoilage of the stored corn.

In an effort to improve the efficiency of a corn picking machine, many different forms of husking beds have been tried, always with the end in view of providing a husking bed which will insure the removal of all of the corn husks from the ears of the corn and yet be free of clogging when picking high yielding corn. Substantially all of the known husking beds have utilized a plurality of rolls arranged in pairs and each pair of rolls spaced somewhat apart from the adjacent pair. The rolls are oppositely rotated so that husks removed from the corn ears are forced downwardly between the rolls.

One form of husking bed heretofore utilized has a plurality of pairs of husking rolls arranged in a circular pattern which define in effect a cylindrical tube and such tube array is disposed in a vertically inclined position. The rolls are driven at one end and the corn ears are also introduced into the bed from the top end. The entire bed is also rotated so that a maximum contact opportunity with the husking rolls is provided. The rotary movement of the bed provides sufficient agitation to minimize any tendency to clog. The husked ears are then discharged out the bottom open end of the bed.

While in theory at least this type of husking bed should outperform more conventional types, it has been found that the difficulty in introducing ears of corn into such a husking bed, because of its almost closed construction, practically precludes its use.

Accordingly, it is an object of this invention to provide an improved husking bed for a corn picking machine which efficiently and completely removes the husk from each ear of corn deposited on the bed.

Another object of this invention is to provide an improved husking bed having a substantially semi-cylindrical, oscillating array of pairs of husking rolls to facilitate the introduction of ears of corn therein but without sacrifice of the operating efficiency of the husking bed.

A further object of this invention is to provide an improved oscillating husking bed for the removal of husks from ears of corn incorporating an improved shelled corn saver.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a reduced scale plan view of a corn picking machine incorporating the improved husking bed constructed in accordance with this invention;

Figure 2 is an enlarged scale sectional view taken along the plane 2—2 of Figure 1;

Figure 3 is an enlarged scale sectional view taken along the plane 3—3 of Figure 2;

Figure 4 is an enlarged scale sectional view taken along the plane 4—4 of Figure 2;

Figure 5 is a sectional view taken along the plane 5—5 of Figure 4; and

Figure 6 is a rear elevational view of the corn picker shown in Figure 1.

As shown on the drawings:

In Figures 1, 2, and 6, there is shown, somewhat schematically, a corn picking machine 10 in which there is incorporated the improved husking bed to be presently described. The corn picker 10 has a substantially horizontal transverse main frame 11 and a pair of ground transporting wheels 12 are journaled at laterally spaced points on the frame 11. A forwardly extending tongue 13, suitably secured to frame 11, is provided for connecting the corn picker 10 to the draw bar 14a of a tractor 14 in trailing relationship thereto. On the left hand side of the corn picker 10, as best shown in Figure 1, a corn stalk gathering unit 15 has a pair of snapping rolls (not shown) for snapping the ears of corn from the stalks introduced into the gathering unit 15. The snapped ears are dropped on to a conveyor 16 transversely mounted at the rear end of the gathering unit 15. The conveyor 16 deposits the snapped ears into the husking bed to be presently described.

A drive shaft 17 suitably journaled on the frame 11 of the corn picker 10 extends forwardly and is connected to the tractor power-take-off. The drive shaft 17 powers the various moving portions of the corn picker 10 as will be later described. The foregoing components obviously form part of a well-known corn picker and the husking bed of this invention may be applied to any type of picker.

On the rear end portion of the frame 11, Figure 6, there is provided an upstanding frame structure 11a consisting of vertical angle bars 11b which have their lower ends welded to a transversely disposed tubular frame member 11c. At the top ends of the vertical frame members 11b, a horizontal frame member 11d is secured as by welding thereto for a purpose to be later described. A pair of vertical angle bars 11e are secured at laterally spaced points to the forward edge of the frame 11, as best shown in Figure 2, and such vertical bars are longitudinally aligned with the rearwardly disposed upright frame members 11b. A transverse angle bar 11f has its ends respectively secured as by welding to the uprights 11e. Further description of the corn picking machine 10 is not believed necessary as we are not concerned with such machine per se. Sufficient structure of the corn picking machine 10, however, is included to show how the improved husking bed of this invention may be conveniently mounted therein.

The improved husking bed indicated generally by the numeral 18 is best shown in Figures 1 and 2. The husking bed 18 comprises a pair of identical end plates 19 which are substantially semi-circular in configuration. The end plates 19 respectively have heart-shaped openings 19a which define a top bridge portion 19b. An integral depending arm 19c is centrally provided on the bridge portion 19b and a transverse hole 19d is provided in such arm portion. The axis of the hole 19d is coincident with the axis of the semi-circular periphery 19e of the end plates 19. One of the end plates 19, mounted on the front of frame 11, has a stub shaft 20 secured within the hole 19d and the stub shaft 20 is journaled in a pillow block 21. The pillow block 21 is secured, as by a pair of bolts 21a, to a central portion of the cross frame member 11f, secured between the front upright bars 11e. The other end plate 19 is identically mounted on the rear end of the frame to the transverse bar 11d secured between the rear uprights 11b. A stub shaft 22 suitably secured in the rearmost end plate 19 is rotatably journaled in a pillow block 23 mounted on the transverse bar 11d. The extended axes of the stub shafts 20 and 22 are coincident, thereby defining a common axis which is sloped forwardly and downwardly, as best shown in Figure 2. As the stub shafts 20 and 22 are perpendicularly disposed to their respective end plates, it follows that the end plates 19 are thus parallel to one another.

A plurality of pairs of husking rolls 24 are provided having axial shafts 24a which project somewhat beyond the ends of the rolls 24. Suitable aligned holes are respectively provided in the end plates 19 so that the ends of shafts 24a may be respectively rotatably journaled in such holes. The rolls 24 are arranged in pairs, as best shown in Figures 3 and 4. One of each pair of the rolls 24 preferably has a rubber husking surface while the other roll of each pair may be of steel if so desired. In any case, the rolls of each pair are in tangential contact. Each pair of rolls 24 is also angularly spaced from the adjacent pair, thereby leaving a gap 25 between the adjacent pairs of rolls. A plurality of longitudinally disposed sheet metal shields 26 are respectively secured by welding between the end plates 19 to cover the gaps 25. The edges of each shield 25 lie closely adjacent to the husking rolls, as best shown in Figures 3 and 4. Thus, the shields 26 bridge the gap between the adjacent pairs of rolls so that the ears of corn will not drop between such rolls, as will be later described.

The husking rolls 24 are rotated in the following manner: A large bull or ring gear 27 is keyed to the rear end of the power driven stub shaft 22. The bull gear 27 has a plurality of peripherally disposed gear teeth 27a. On at least one of the rear shaft ends 24a of each pair of rolls 24, there is non-rotatably secured a spur gear 28. The teeth of the spur gear 28 mesh in driving relationship with the teeth 27a of bull gear 27. Inasmuch as one of the pairs of rolls has a rubber surface and is in contact with its adjacent roll, the rotation of the driven roll will effect rotation of the roll in contact with it. Thus, the rolls of each pair will rotate in opposite directions and the rotation of the bull gear 27 is such that the pairs of rolls 24 will be rotated downwardly at their nip in order that husks removed from the ears of corn will be pulled downwardly between such rolls.

The end plates 19 are maintained in aligned relationship by a pair of vertical side plates 29. The side plates 29 have their ends respectively welded to the end plates 19 adjacent their upper ends. The side plates 29 are laterally braced by an end portion 29a. The side plates 29 also function to prevent ears of corn from falling out of the husking bed 18 as will be later described.

To insure contact of the ears with the rolls and to eliminate clogging, the husking bed 18 is rocked about its axis by a crank arm 30. The crank arm is non-rotatably secured to a stub shaft 31 which is rotatably journaled in a frame member 11g, secured between one of the uprights 11b and a brace member 11h, as best shown in Figure 6. A sprocket or pulley 32 is also non-rotatably secured to the stub shaft 31. A triangular lug 33 is secured, as by welding, to the rear end plate 19, as best shown in Figure 4 on its outer periphery. A link 34 has its ends respectively pivotally connected to the lug 33 and the end of crank arm 31. Thus rotation of the crank arm 30 imparts a reciprocating rocking motion to the husking bed 18.

An upwardly opening, triangularly-shaped trough 35 is mounted beneath the husking bed 18, as best shown in Figures 2 and 4. The trough 35 comprises a sheet metal member and has its ends respectively secured by welding between the uprights 11b and 11e. Trough 35 is disposed in parallel relationship to the husking bed 18 and a perforated screen 36 covers the open top of trough 35. Screen 36 has its edges suitably secured to the top edges of trough 35 and is arcuately bent to the same arcuate configuration as that of the end plates 19. The screen 36, however, is vertically spaced below the husking bed 18 a substantial amount, as best shown in Figures 3 and 4. A longitudinally disposed blade member 37 has its ends respectively secured between the end plates 19. Blade 37 is preferably welded in such a position to the end plates and the blade is radially disposed relative to the axis of the end plates. The blade 37, which is preferably a rectangular bar member, has its lower longitudinal edge disposed closely adjacent the arcuate surface of the screen 36. Thus when the husking bed 18 is rocked, the blade 37 sweeps across the arcuate configuration of screen 36.

Power for rocking the husking bed as well as driving other parts of the corn picking machine is obtained from the power-take-off of the tractor through the drive shaft 17. The drive shaft 17 rotates a large diameter pulley 38, Figure 6, rotatably journaled in suitable bearings (not shown) mounted on the rear frame structure. A pair of pulleys 39 and 40 are also secured on the rear end of the drive shaft 17, as shown in Figure 6, closely adjacent the drive pulley 38. A pulley 41 is secured to the rear end of stub shaft 22, as best shown in Figures 5 and 6, and a belt 42 is trained around the pulleys 39 and 41. A belt 43, trained around pulleys 32 and 40, effects driving connection between the pulley 38 and crank arm 30. The conventional snapping rolls of the corn picker (not shown) are rotated by a large diameter pulley 44 mounted at the rear end of the gathering unit 15, as best shown in Figure 6. A belt 45 connects the pulley 44 with the driving pulley 38. Power to drive the snapping rolls (not shown) is taken off the pulley 44 by a chain 46 to effect driving of sprockets 47 and 48 which actually effect rotation of the snapping rolls. However, as we are not directly concerned with the driving of the snapping rolls, further description thereof is not believed necessary.

At the forward end of the husking bed 18, as shown in Figures 1 and 2, there is provided a transverse, substantially horizontally disposed collecting trough 49. The collecting trough 49 communicates with the forwardly sloping trough 35 so that shelled corn received by the trough 35 will slide downwardly into the bottom of the trough 49. A vertical transversely disposed shield 49a is secured, as by welding, to the transverse trough 49, thereby defining an upwardly facing opening 49b. The trough 49 communicates with a raddle-type conveyor in an elevator 50, suitably mounted on the right hand side of the corn picking machine, as shown in Figure 1. An auger 51 has its ends rotatably journaled in the sides of the transverse trough 49 so that such auger may revolve closely adjacent the bottom of the trough 49 to feed shelled corn collected in the trough 49 from the trough 35 to move it sideways to the elevator 50. A sheet metal chute 52, as shown in dotted outline in Figure 2, covers the top of the auger so that the husked ears of corn delivered from the husking bed 18 fall on to such chute and are delivered sideways to the elevator 50. The chute 52 prevents the ears of corn from falling on the auger to thereby avoid excessive shelling of the corn.

Operation

Corn snapped from the standing stalks of corn by the gathering unit, and snapping rolls contained therein, is delivered to the upper open end of the husking bed 18 by the conveyor 16. The power driven pulley 38 effects rotation of the bull gear 27 which continuously rotates the pairs of husking rolls 24. As the crank arm 30 is being continually rotated by its connection to the driving pulley 38 through the belt 43, the husking bed 18 will be rocked through a substantial angle about its inclined longitudinal axis. The ears of corn dropped into the husking bed 18 will then be rolled from side to side as the husking bed 18 rocks back and forth. Hence, the husking rolls 24 will have ample opportunity to engage the husks for removal thereof because of the large area of rolls thus made available to grasp the husks and remove them from the corn ears.

As the husks are engaged, the husking rolls pull the husks between such rolls whereupon they are ejected downwardly below such rolls on to the arcuate screen 36. The shields 26, provided between the spaced apart pairs of rolls 24, insure that the ears will not fall between the adjacent pairs of rolls. Any corn shelled during the husking operation falls on to the screen 36 and the wiping blade 37, which reciprocates with the husking bed 18, wipes the screen 36 free of corn husks and forces the shelled corn to fall through screen 36 and into the trough 35 whereupon the shelled corn will fall by gravity to be transferred by auger 51 to the elevator 50.

Due to the sloping of the husking bed 18, gravity, plus the continuous oscillation, will cause the ears of corn introduced into the husking bed to move downwardly and forwardly so that the entire length of the husking bed may be utilized for removing the husks from the corn, thereby further insuring that all of the husks will be removed. The ears of corn passing through the husking bed fall upon the chute 52 which is inclined downwardly to the left, as shown in Figures 1 and 2, whereupon the ears will slide on to the elevator 50 for delivery to a trailing wagon.

From the foregoing description, it is thus clearly apparent that there is here provided an improved husking bed which provides a large contact area of its husking rolls with the ears of corn deposited into such husking bed to thereby efficiently and thoroughly remove the husks from such ears of corn. The rocking motion of the husking bed is utilized to swing a wiping blade across the face of a shelled corn receiving trough to effect removal of corn husks deposited thereon and to force the shelled corn through the perforations in the face of the trough for collection of such shelled corn. This arrangement provides for a simple and inexpensively manufacturable shelled corn saver. In addition, the open construction of the bed facilitates the introduction of the ears of corn to such bed thereby increasing the efficiency of the corn picking machine.

It will, of course, be understood that various details of construction may be varied through a wide range without departing from the principles of this invention and it is, therefore, not the purpose to limit the patent granted hereon otherwise than necessitated by the scope of the appended claim.

I claim:

In a corn harvesting machine having a frame, a husking unit comprising in combination a pair of opposed, laterally-spaced end plates having a common axis, a plurality of pairs of cooperating husking rolls having their ends respectively rotatably journaled in said end plates, said husking rolls being radially disposed about said common axis of said end plates and angularly spaced apart to define an upwardly open semi-cylindrical husking bed, means for rotatably journaling said end plates on the frame with said common axis inclined to vertically slope said husking rolls, an arcuate screen mounted underneath said husking bed parallel thereto but spaced vertically downwardly therefrom, said screen receiving husks and shelled corn from said husking rolls, a generally longitudinally extending blade member dependingly mounted on said husking bed, said blade member being in substantial contact with said screen, means for rotating said husking rolls, and means for rocking said husking bed, whereby said blade member wipes across the surface of said screen to remove corn husks therefrom and to force the shelled corn through the perforations of said screen.

References Cited in the file of this patent

UNITED STATES PATENTS

| | | |
|---|---|---|
| 53,644 | McGill | Apr. 3, 1866 |
| 343,789 | Baker | June 15, 1886 |
| 718,902 | Berry | Jan. 20, 1903 |
| 1,027,013 | Stowell | May 21, 1912 |
| 1,179,438 | Knapp | Apr. 18, 1916 |
| 1,317,736 | Smolley | Oct. 7, 1919 |
| 1,463,364 | Knapp | July 31, 1923 |